Nov. 9, 1965   N. HOGLUND   3,216,219
COUPLINGS
Original Filed April 25, 1958   2 Sheets-Sheet 1

INVENTOR
NILS HOGLUND
BY
William A. Balesak
ATTORNEY

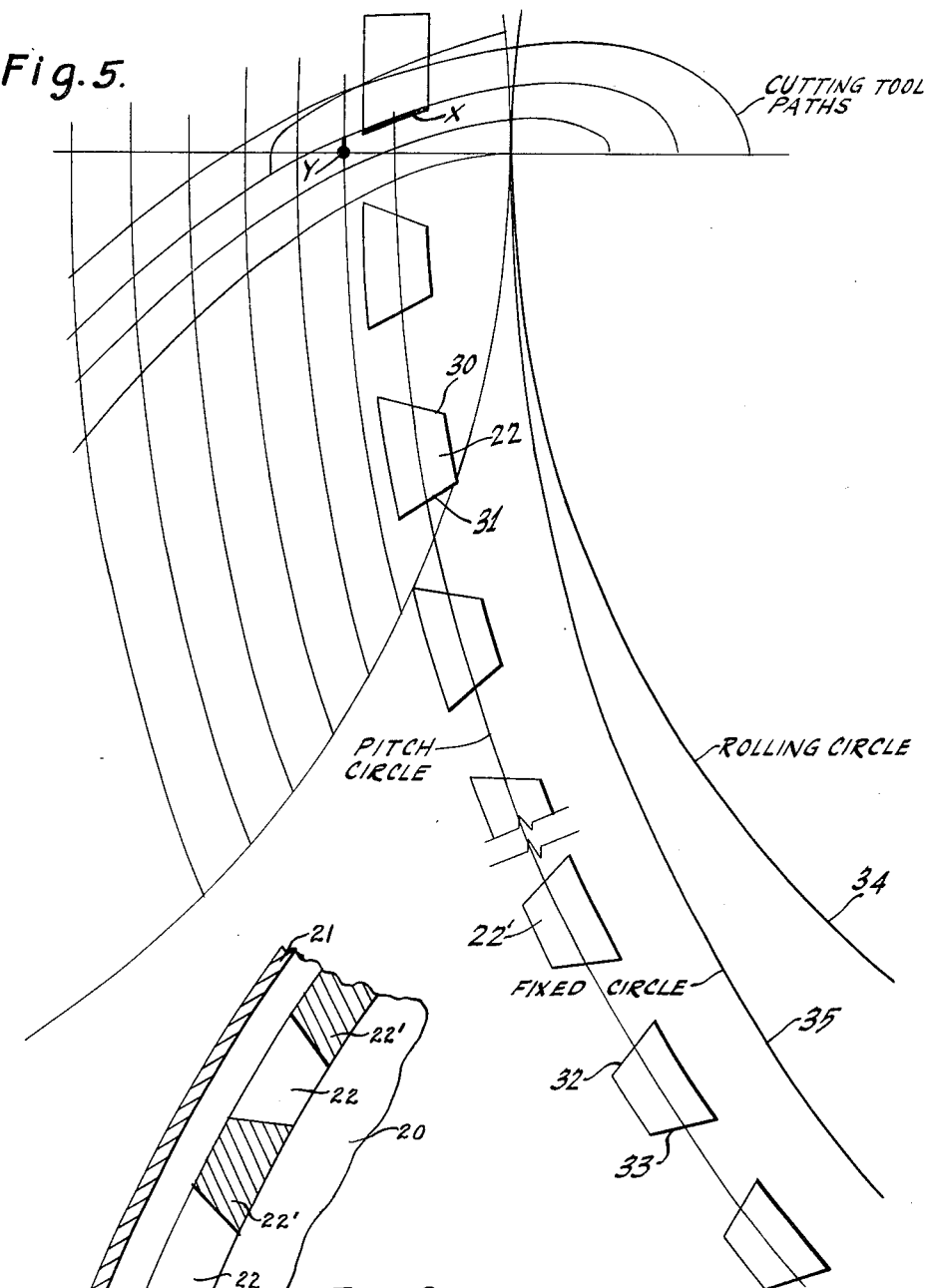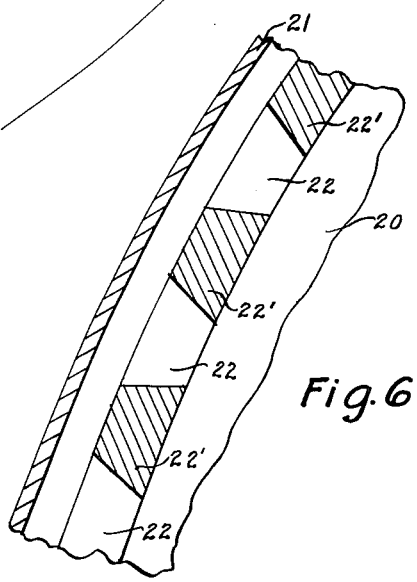

United States Patent Office 3,216,219
Patented Nov. 9, 1965

3,216,219
COUPLINGS
Nils Hoglund, 296 Hartshorn Drive, Short Hills, N.J.
Original application Apr. 25, 1958, Ser. No. 730,891, now Patent No. 3,118,344, dated Jan. 21, 1964. Divided and this application Mar. 12, 1963, Ser. No. 264,606
7 Claims. (Cl. 64—9)

This application is a division of my copending application, Serial No. 730,891, filed April 25, 1958, now Patent No. 3,118,344.

My invention relates broadly to couplings comprising driving and driven members wherein the contacting surfaces of the coupling elements lie along cycloidal curves and wherein the elements extend from the rotating members of the coupling and parallel to the axis of rotation of said members.

In one application, a coupling is required for connecting turbine wheels and spacers in the axial compressor of gas turbines where the splines, that is, the coupling elements, have to be cut very close to an interfering surface. For example, the coupling was to be located within 1/3" of the inside of the dovetail form on the periphery of the turbine wheel. In this arrangement, the dovetail is a flange extending around the periphery of the turbine wheel and forms a protrusion at the edge of the wheel. This makes it impossible to use conventional equipment to machine teeth or splines so close to the dovetail form or flange on the turbine wheel.

In addition, the coupling teeth or splines must have a form that will satisfy several requirements. These are:

(1) The tooth form must be extremely accurate;
(2) The teeth must be economically machined;
(3) The teeth must have the ability to centralize (that is, bring to a common center) the two members of the coupling when under force. In other words, the coupling should have the characteristics found in an involute spline which tends, under load, to find a common center; and
(4) The coupling should have approximately 85% contact when assembled.

It is therefore an object of my invention to provide a coupling having coupling teeth forms satisfying the characteristics pointed out above.

A coupling made according to my invention includes a pair of engaging members, a driving and a driven member, movable axially into engagement. One of said members includes a disc having a dovetailed shaped rim and having coupling teeth lying along a circle closely adjacent the rim, the teeth extending normally of the disc and parallel to the rim. The teeth have a depth less than that of the rim and the engaging sides or surfaces of the teeth lie along cycloidal curves and extend normally of the surface of the disc. The other of the coupling members includes a ring or drum-like member having a rim provided with an inturned flange upon which are formed complementary teeth extending toward and engaging the teeth on said disc. Because of their form, these teeth are locked in by the teeth on the disc. I show several forms.

Apparatus and the method for forming gears according to my invention will be described below. The apparatus includes a base having a support for a coupling member or work piece to be worked on and an upright or vertical support for the cutting apparatus assembly. A slide is mounted on the vertical support and has screw means for vernier vertical adjustment.

A housing in the form of an annular supporting member is mounted on a second slide movable on said vertical support. This last slide is connected to a cylinder in turn supported on its piston rod fixed to the first slide.

A spindle mounted in said annular supporting member and whose axis of rotation coincides with the axis of rotation of the coupling member to be worked on has mounted thereon and off center a stud rotatably supported a cutting plate assembly on which is supported a plurality of cutting tools. The housing has mounted at its lower end an internal gear which is meshed to a pinion gear attached to the cutter plate. The spindle is driven by a motor and as it rotates the stud and cutter plate about the spindle axis, the cutter plate is made to rotate about the off-center stud causing the cutting tools to move along cycloidal paths across the tooth ring on the coupling member to form the teeth. Automatically controlled hydraulic means moves the slide and tool assembly by small increments to feed the cutting tool assembly toward the work piece as the teeth are being formed.

As the cutter tool, which is mounted in a slidable support spring pressed away from the work piece, moves across the tooth ring, a cam on the spindle assembly contacts a cam follower on the tool support to press the tool support toward the work piece in its cutting pass. As the tool moves out past the rim of the coupling member, the tool moves back to clear the dovetail rim.

At the top of the housing is a switch mechanism which is set so that after being tripped a predetermined number of times, controls circuits and other mechanism for causing infeeding of the tool assembly supporting slide for the next increment cut. Other limiting mechanism limits the infeeding and rapid retraction of the housing away from the work piece.

The invention will be described with reference to the accompanying drawings in which:

FIGURE 5 is a diagram showing the tooth development curves used in making the teeth on the coupling members; and FIGURE 6 is a fragmentary sectional view taken along line 6—6 of FIGURE 3.

One of the principal problems as pointed out above in connection with couplings of the kind under consideration, is to maintain engagement between the driving and driven teeth of a disc and a spacer where high speed rotation is involved. That is, the teeth must be locked against relative radial movement and separation during operation.

Figure 1:
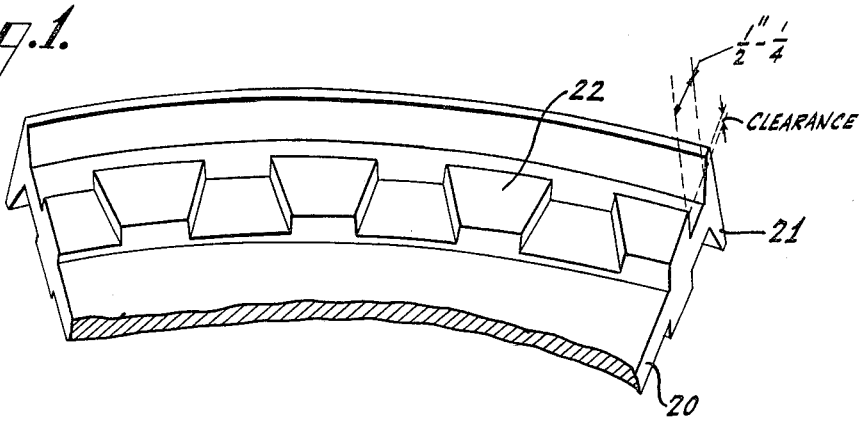
FIGURE 1 is a partial perspective of the female portion of a coupling made according to my invention comprising the turbine disc.
Figure 2:
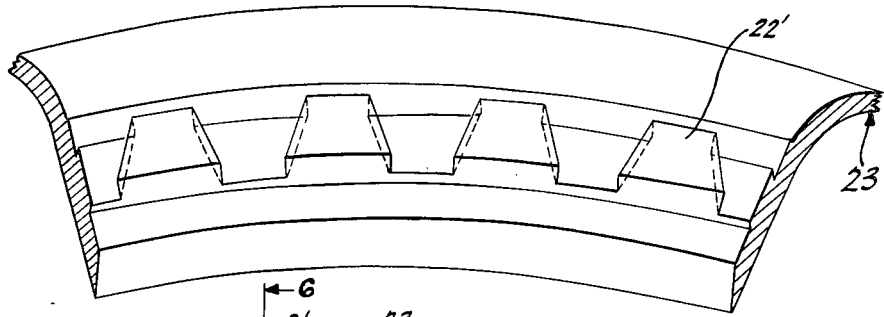
FIGURE 2 is a partial perspective of the male part of the coupling or the turbine spacer.
Figure 3:
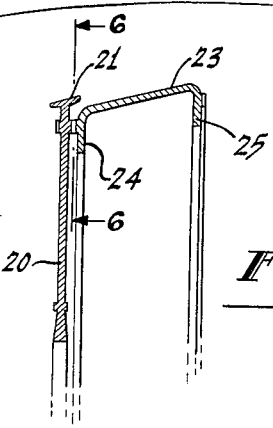
FIGURE 3 is a partial section of the two coupling members in coupling relationship.
Figure 4:
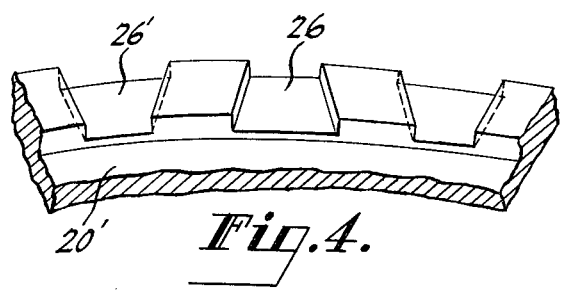
FIGURE 4 is a perspective showing a modified tooth formation in a turbine disc.

Referring now to FIGURES 1, 2 and 3, a plain cycloid coupling useful in turbines includes the female disc member 20 shown in FIGURE 1. It is provided with a rim 21 of dovetail formation. Lying in a circle and closely spaced from the rim are the coupling teeth 22, the outer extremities of which are spaced a distance of 1/4" to 1/2" from the rim 21. It will be noted that the rim 21 extends normally further from the disc than the teeth as shown by the dotted lines and thus that any cutting tool for forming these teeth must be lifted on moving out of or into the tooth circle to clear this rim. In FIGURES 2 and 3, I show the male coupling member 23, which is in the form of a tapered ring having inwardly extending flanges 24 and 25. Teeth 22' are formed on rim 24 and are formed to be complementary to the teeth 22 on the disc. In FIGURE 4, I show a modification of the disc 20' where alternate teeth 26 and 26' are inclined to each other so that when engaged with complementary teeth on the male coupling member, the teeth are locked in two directions.

The configuration which I have found to be most satisfactory for the coupling teeth is that of a prolate hypocycloid curve. The development of such a tooth profile is shown in FIGURE 5. The path of the cutting point must move across the tooth circle both from the inside out and from the outside in. If the fixed circle of the rolling circle lies inside the pitch circle of the teeth to be formed, the cutting tool must be supported in such a way as to have movement along the path described. That is, the cutter must be mounted on a rotatable support that revolves about an axis in turn revolving around the axis or center of the tooth or pitch axis, and must move across the tooth circle.

The teeth 22 on the female member and the teeth 22' on the male member have engaging surfaces 30, 31 and 32, 33 lying along a cycloid path generated by a point lying outside the rolling circle 34 rolling on the fixed circle 35. The path X shows the path of the point and the shape of the contour as well as the path of the cutting tool. Since the rolling circle is rolling internally of the directing or fixed circle, a hypocycloid path is generated. In a preferred form the rolling circle has a ratio of 56:37 to the fixed circle resulting in substantially straight sides for the teeth.

What is claimed is:

1. A coupling comprising driving and driven members including a disc having a rim thereon extending transversely thereof, a plurality of coupling teeth lying on a circle within and closely spaced from said rim, said teeth extending normally of said disc parallel to the axis of rotation of said disc and having less height than said rim, the contours of the engaging surfaces of said teeth lying on cycloidal curves, and a cooperating drum shaped member having a rim extending toward said disc, the edge of said rim being provided with a flange having teeth extending toward and in engagement with the teeth on said disc, the contours of the side surfaces of said teeth on said drum shaped member being complementary to the surfaces of the teeth on said disc and being in contact therewith along said surfaces.

2. A coupling comprising driving and driven members including a disc, a plurality of coupling teeth lying on a circle within and closely spaced from the edge of said disc, said teeth extending normally of said disc, the contours of the engaging surfaces of said teeth lying on cycloidal curves, and a cooperating member having teeth extending toward and in engagement with the teeth on said disc, the contours of the side surfaces of said teeth on said cooperating member being complementary to the surfaces of the teeth on said disc and being in contact therewith along said surfaces.

3. A coupling comprising driving and driven members including a first member having a plurality of coupling teeth lying on a circle having its center at the axis of rotation of said member and extending parallel to the axis of rotation, the contours of the engaging surfaces of said teeth lying on cycloidal curves, and a cooperating member having teeth extending toward and in engagement with the teeth on said first member, the contours of the side surfaces of said teeth on said cooperating member being complementary to the surfaces of the teeth on said first member and being in contact therewith along said surfaces.

4. A coupling comprising driving and driven members including a disc having a rim thereon extending transversely thereof, a plurality of coupling teeth lying on a circle within and closely spaced from said rim, said teeth extending normally of said disc parallel to the axis of rotation of said disc and having less height than said rim, the contours of the engaging surfaces of said teeth lying on cycloidal curves, and a cooperating drum shaped member having a rim extending toward said disc, the edge of said rim being provided with a flange having teeth extending toward and in engagement with the teeth on said disc, the contours of the side surfaces of said teeth on said drum shaped member being complementary to the surfaces of the teeth on said disc and being in contact therewith along said surfaces, the teeth on said disc tapering toward each other in an outwardly directed radial direction.

5. A coupling comprising driving and driven members including a first member having a plurality of coupling teeth lying on a circle having its center at the axis of rotation of said member and extending parallel to the axis of rotation, the contours of the engaging surfaces of said teeth lying on cycloidal curves, and a cooperating member having teeth extending toward and in engagement with the teeth on said first member, the contours of the side surfaces of said teeth on said cooperating member being complementary to the surfaces of the teeth on said first member and being in contact therewith along said surfaces, the teeth on said disc tapering toward each other in an outwardly directed radial direction.

6. A coupling comprising driving and driven members including a disc having a rim thereon extending transversely thereof, a plurality of coupling teeth lying on a circle within and closely spaced from said rim, said teeth extending normally of said disc parallel to the axis of rotation of said disc and having less height than said rim, the contours of the engaging surfaces of said teeth lying on cycloidal curves, and a cooperating drum shaped member having a rim extending toward said disc, the edge of said rim being provided with a flange having teeth extending toward and in engagement with the teeth on said disc, the contours of the side surfaces of said teeth on said drum shaped member being complementary to the surfaces of the teeth on said disc and being in contact therewith along said surfaces, adjacent pairs of said teeth on said disk being inclined toward each other in a direction extending radially outward from the axis of rotation of said disc.

7. A coupling comprising driving and driven members including a first member having a plurality of coupling teeth lying on a circle having its center at the axis of rotation of said member and extending parallel to the axis of rotation, the contours of the engaging surfaces of said teeth lying on cycloidal curves, and a cooperating member having teeth extending toward and in engagement with the teeth on said first member, the contours of the side surfaces of said teeth on said cooperating member being complementary to the surfaces of the teeth on said first member and being in contact therewith along said surfaces, adjacent pairs of said teeth are inclined toward each other in a direction extending radially outward from the axis of rotation of said disc.

References Cited by the Examiner

UNITED STATES PATENTS

| 1,429,980 | 9/22 | Spangler | 64—9 |
| 2,025,827 | 12/35 | Ricefield | 64—14 |
| 2,515,366 | 7/50 | Zublin | 64—9 |

FOREIGN PATENTS

| 578,287 | 6/46 | Great Britain. | |

ROBERT C. RIORDON, *Primary Examiner.*